United States Patent [19]

Wolf

[11] 4,094,348
[45] June 13, 1978

[54] TREE AND STUMP SPLITTER

[76] Inventor: Robert H. Wolf, 408 S. Willow St., Flora, Ind. 46929

[21] Appl. No.: 743,487

[22] Filed: Nov. 19, 1976

[51] Int. Cl.² ............................................. A01G 23/08
[52] U.S. Cl. .................................. 144/34 F; 144/34 R; 403/56
[58] Field of Search ............ 144/34 R, 34 F, 309 AC; 403/56, 182, 188

[56] References Cited

U.S. PATENT DOCUMENTS

| | | | |
|---|---|---|---|
| 1,940,258 | 12/1933 | Lautz | 403/56 X |
| 2,138,150 | 11/1938 | Flynn et al. | 144/34 F |
| 2,633,880 | 4/1953 | Mattson | 144/34 F |
| 3,033,253 | 5/1962 | Purdy | 144/34 F |
| 3,557,850 | 6/1968 | Owens | 144/34 F |

FOREIGN PATENT DOCUMENTS 229,084   2/1969   U.S.S.R. ............................ 144/34 F

*Primary Examiner*—Othell M. Simpson
*Assistant Examiner*—W. D. Bray
*Attorney, Agent, or Firm*—Victor J. Evans & Co.

[57] ABSTRACT

A tree and stump splitter having a vertical edged splitting blade, a horizontal cut off blade, and quick attachment means to secure the splitter to a bulldozer blade.

4 Claims, 11 Drawing Figures

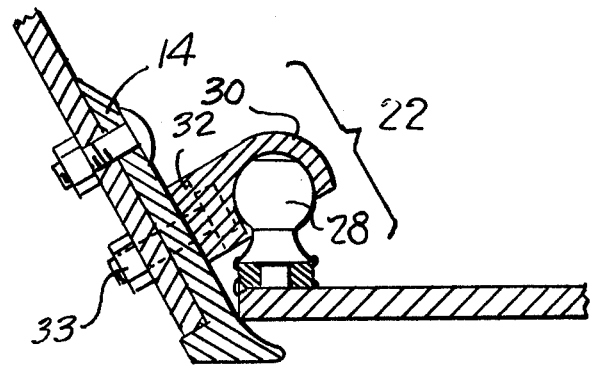
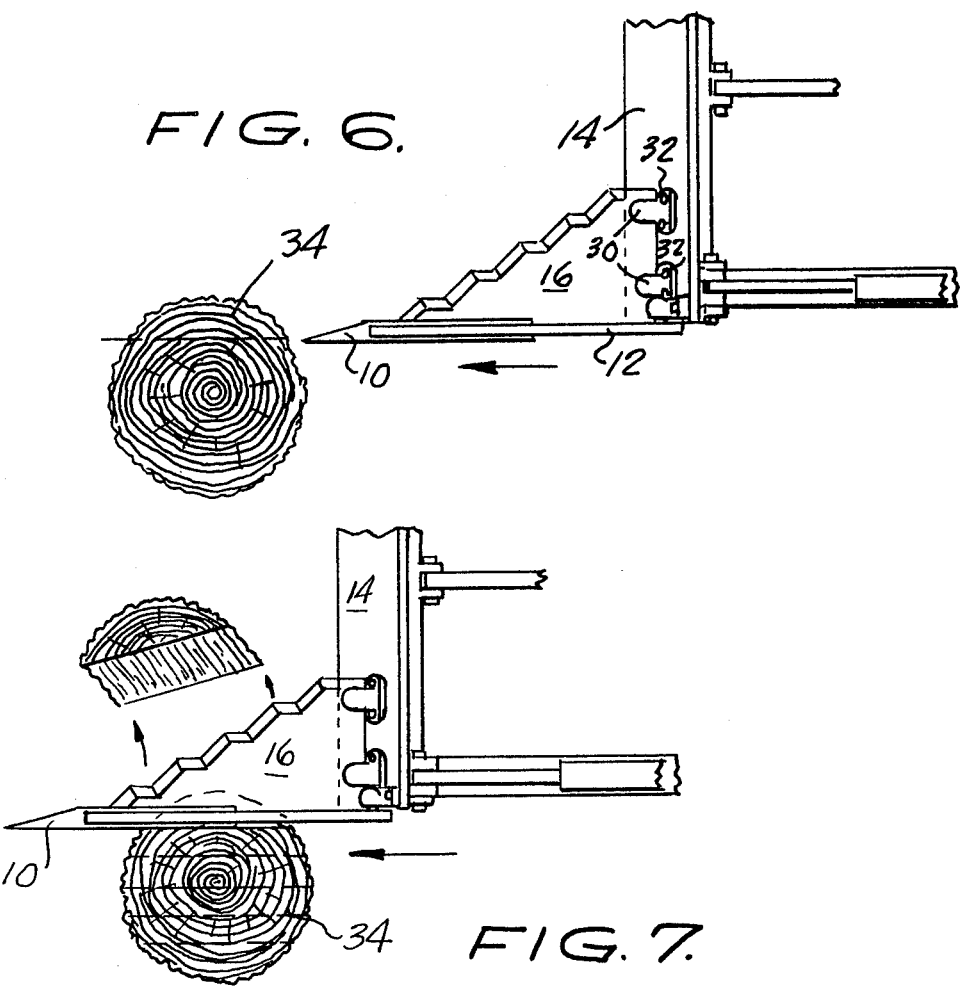

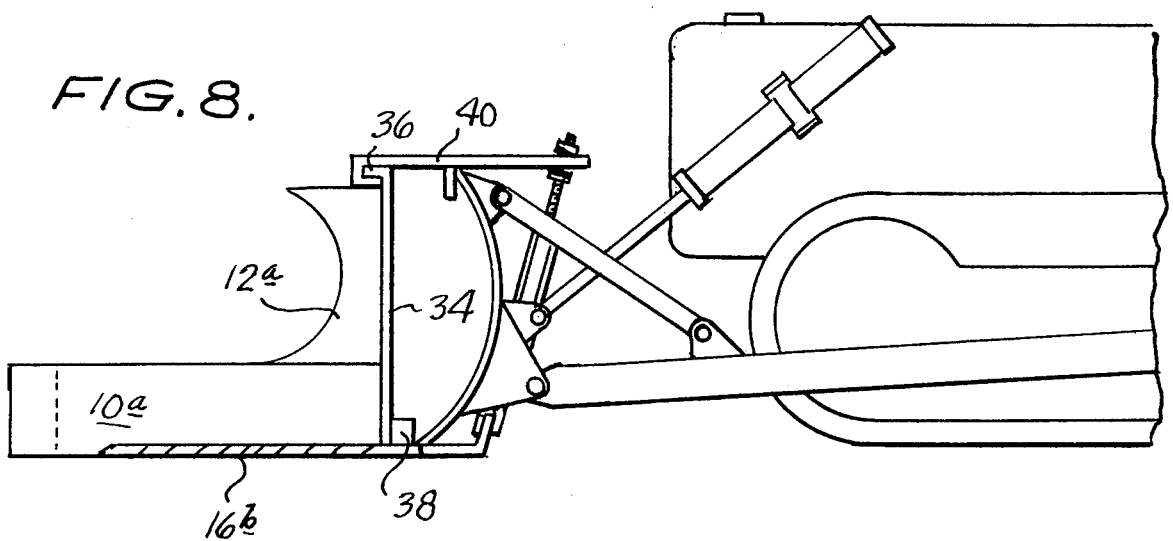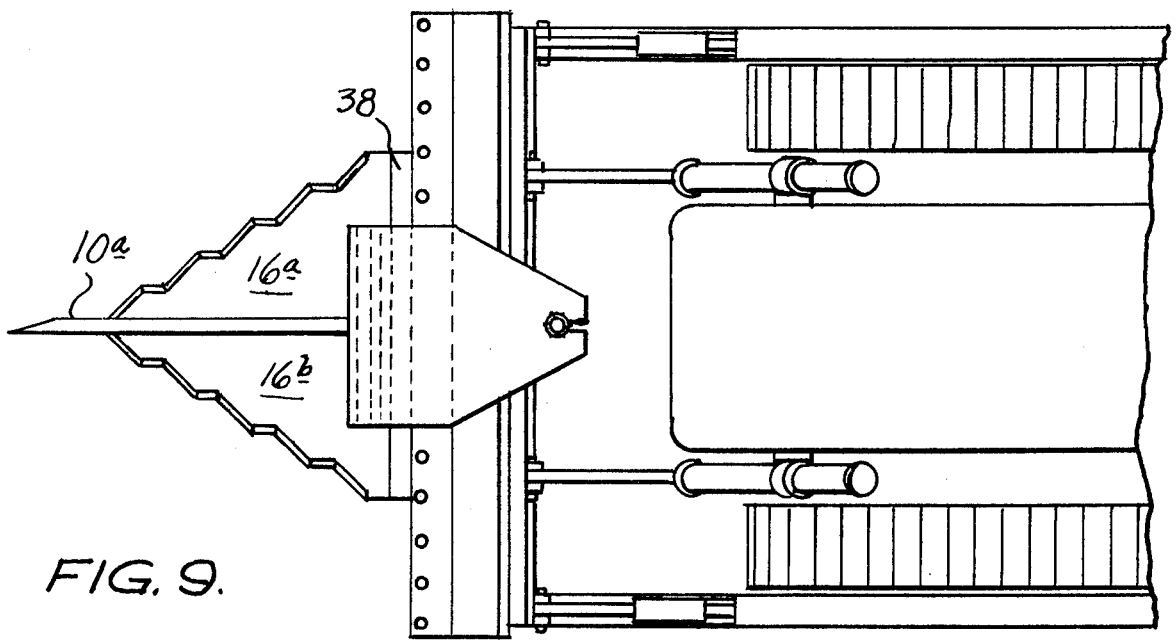

TREE AND STUMP SPLITTER

BACKGROUND OF THE INVENTION

Field of the Invention

In grading land it frequently happens that the land has, or has had trees growing on it which makes grading with only a bulldozer impossible.

It is an object of the present invention, therefore, to provide a device that may be easily and quickly mounted on a bulldozer blade so that trees, or stumps of trees encountered in clearing and grading land may be removed for burning or other disposition without requiring digging or blasting.

Other and further objects and advantages will appear from the following specification taken with the accompanying drawings in which like reference characters refer to similar parts in the several views.

BRIEF DESCRIPTION OF THE DRAWINGS

FIG. 5 is an enlarged fragementary section taken at 5—5 of FIG. 4 showing a means to secure the splitter to the bulldozer blade;

FIG. 6 is a plan view showing the splitter about to split a stump;

FIG. 7 is a plan view similar to FIG. 6 having split a portion from the stump;

FIG. 8 is an elevation similar to FIG. 1 showing a modification of the splitter and mount for the modified splitter on the bulldozer;

FIG. 9 is a plan view similar to FIG. 2 showing the modification; and

DESCRIPTION OF THE PREFERRED EMBODIMENTS

Figure 1:
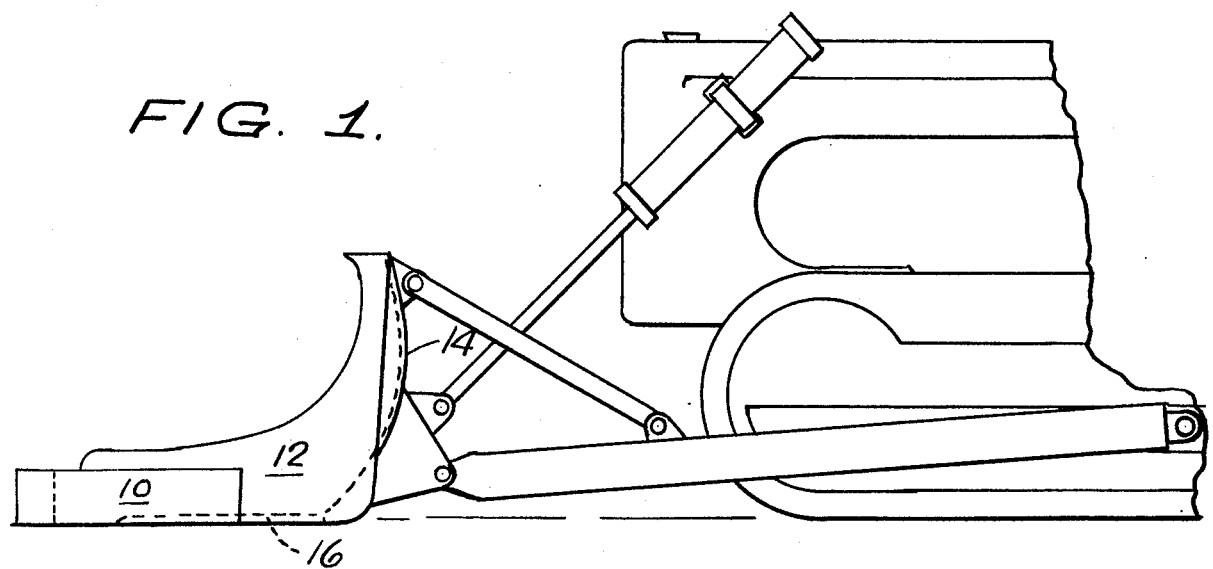
FIG. 1 is a side elevation of the front end of a bulldozer with the device of this invention attached.
Figure 2:
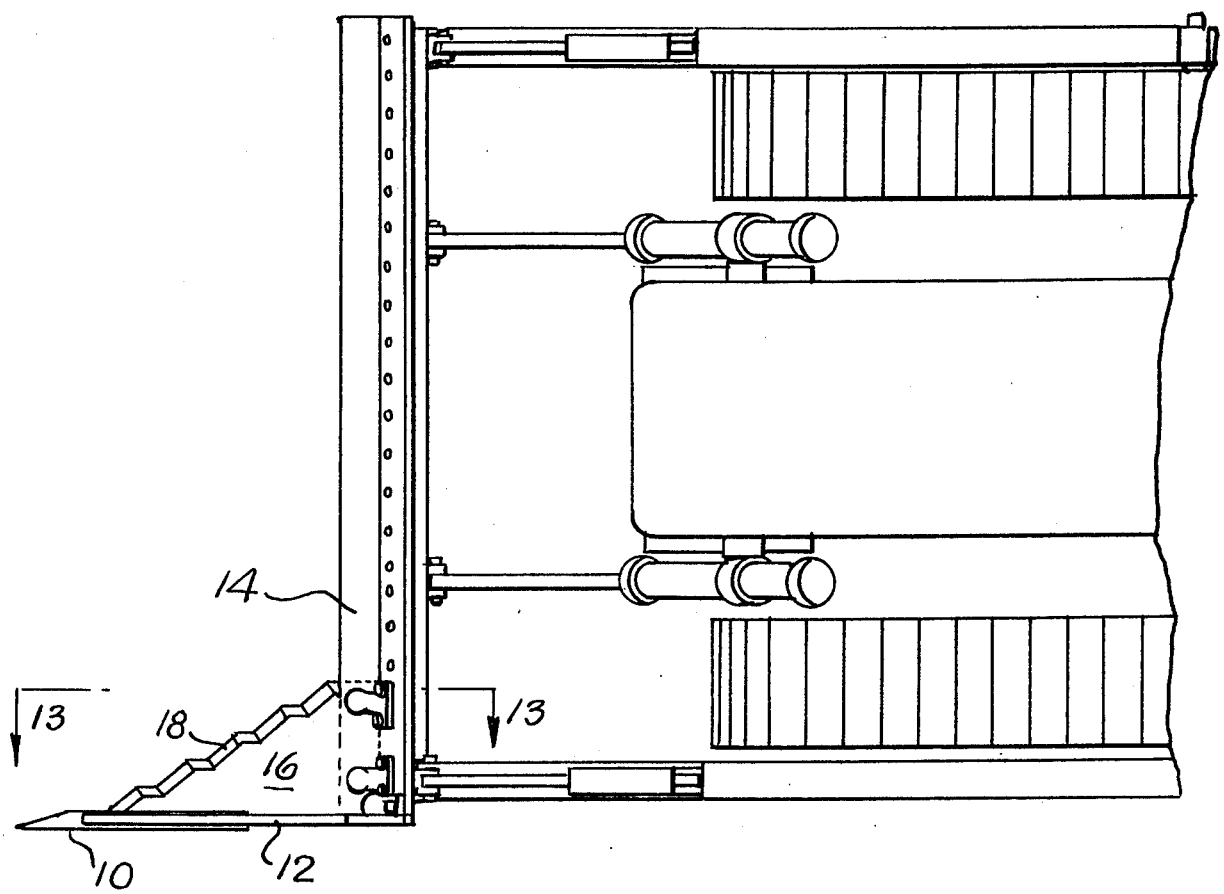
FIG. 2 is a plan view of FIG. 1.

Referring now to the drawings in detail, wherein like reference characters indicate like parts throughout the several figures, the reference numeral 10 indicates generally a sharp splitting blade.

Figure 3:
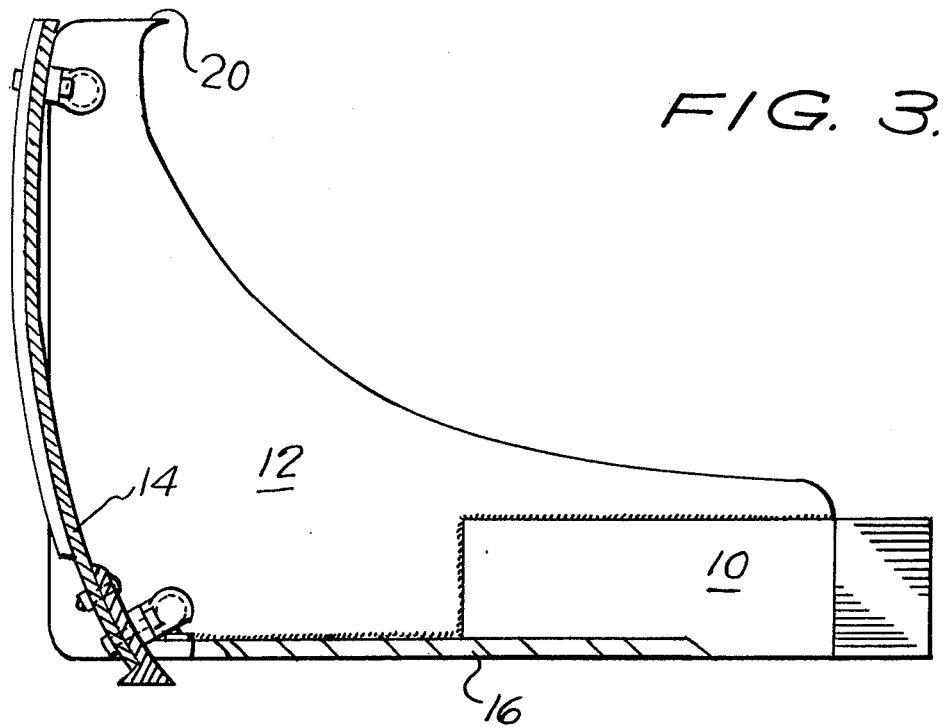
FIG. 3 is an enlarged section taken on line 3—3 of FIG. 2.
Figure 4:
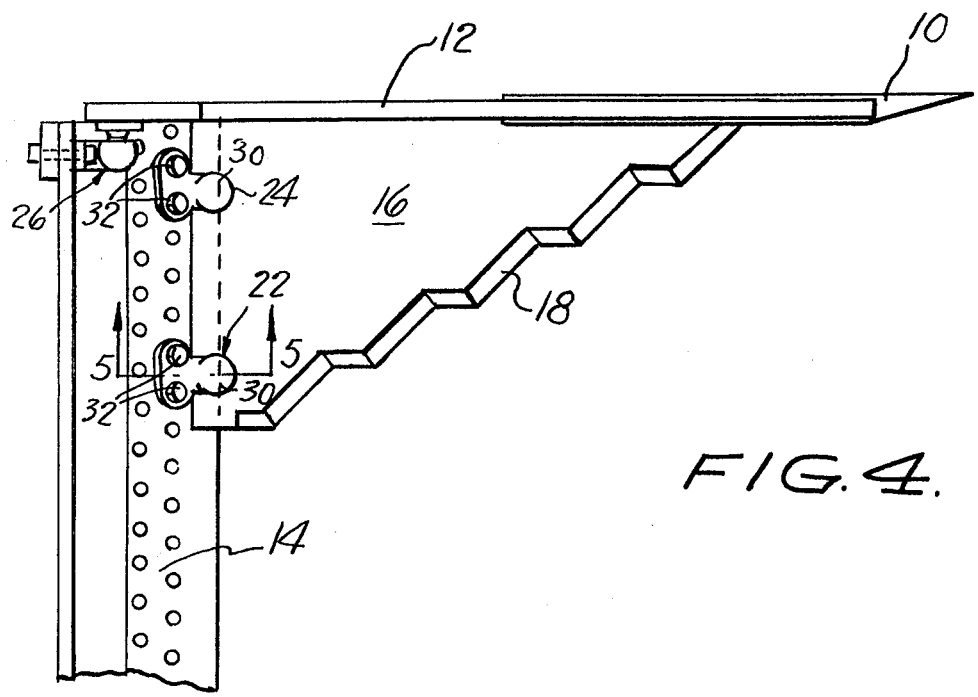
FIG. 4 is a plan view of FIG. 3.

The splitter comprises a vertical edged hardened sharp splitting blade 10 mounted on a vertical support plate 12 that projects a substantial distance forwardly of a bulldozer blade 14, as best seen in FIGS. 3 and 4. Support plate 12 is intended to be included here below when reference is made to the splitting blade.

A horizontal cut-off blade 16 extends laterally of the splitting blade 10, 12 and is provided with a sharpened leading edge 18 which may be serrated.

Support plate 12 preferably bears on the end of bulldozer blade 14. The device shown is mounted on the left hand end of the bulldozer blade, but it is noted a mirror image of the device may be provided to be mounted on the other end of the blade.

The top edge of support plate 12 curves upwardly from splitting blade 10 then forwardly at its upper end, as at 20, as a protection against material such as logs or poles continuing up over the top edge of the blade.

The blade assembly 10, 12, 16 is secured to bulldozer blade 14 by three triangular disposed connectors 22, 24, and 26. These connectors are identical so only connector 22, seen in FIG. 5, will be described.

Connector 22 comprises a ball 28 similar to a trailer hitch ball permanently fixed to cut off blade 16 and enclosed in a socket 30 which has a portion 32 extending to one side to be bolted to bulldozer blade 14. Portion 32 is formed with laterally extending flanges provided with holes to receive bolts 33 by which socket 30 is secured to bulldozer blade 14.

Having connectors 22, 24 and 26 of this ball and socket construction, mounting the splitter on the bulldozer blade is facilitated as the blade need only to be positioned against the lower corner of support plate 12 and its leading edge under horizontal cut off blade 16 and the sockets 30 being swingable on balls 28, the bolt holes in the flanges 32 may readily be brought into alignment with bolt holes provided in bulldozer blade 14. The bolts are then insered and tightened and the splitter is ready for operation.

The method of using this stump splitter is seen in FIGS. 6 and 7. Where the blade 10 is driven into a large stump 34 and a portion at one side split vertically by blade 10 is cut off by horizontal cut off blade 16 as seen in FIG. 7. As indicated by dotted lines in FIG. 7 successive portions of large stumps may be removed. Prior to development of the stump splitter large stumps required digging and/or blasting to be removed.

Where only fairly small trees and bushes are to be encountered in the clearing and grading operation a stump splitter such as seen in FIGS. 8 and 9 may be desireable. A small tree split approximately in the middle may have both portions cut off, whereas, in the case of a large stump as seen in FIGS. 6 and 7, the horizontal cut off blade 16 could not cut off the entire stump at one time.

The tree splitter of the modification shown in FIGS. 8, 9, 10 and 11 comprises a vertically edged blade 10a similar to blade 10 of FIGS. 1 to 7. On each side of blade 10a is a horizontal cut off blade 16a, and 16b so that if a tree is split by blade 10a the portions of the tree to each side will be cut off as the blades 16a and 16b advance.

As in the case of support plate 12, support plate 12a curves forwardly at the top.

Figure 10:
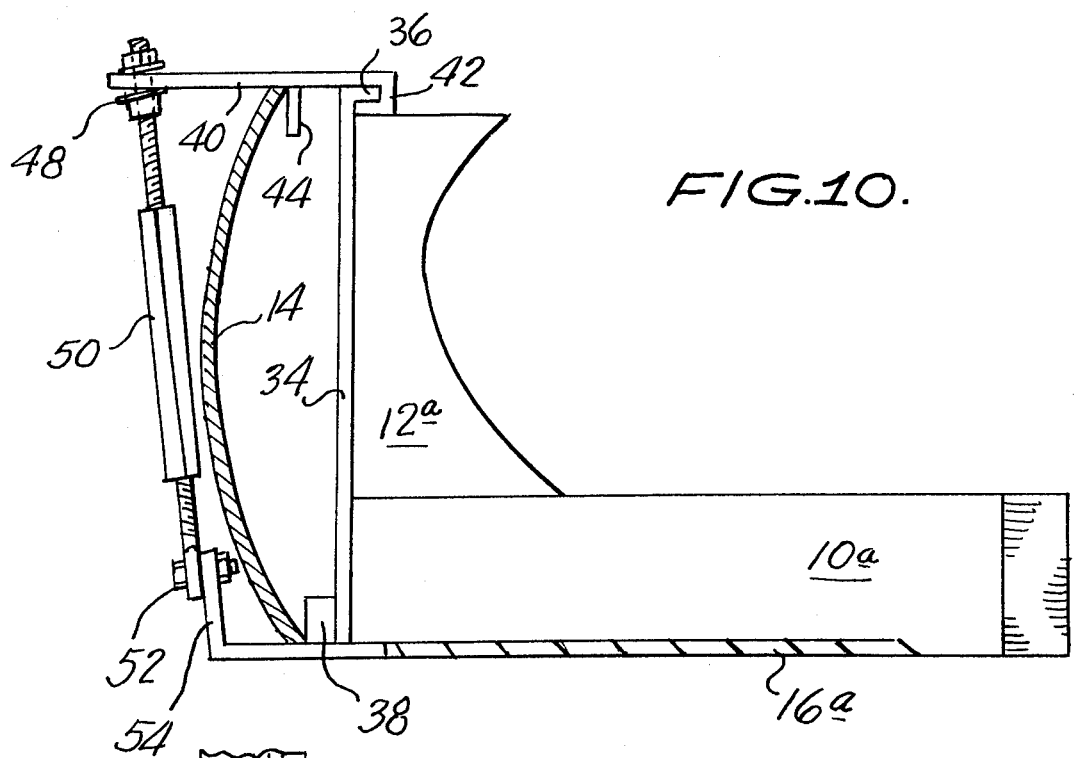
FIGS. 10 and 11 are enlarged side and top views respectively of the means to mount the splitter of FIGS. 8 and 9 on the bulldozer.
Figure 11:
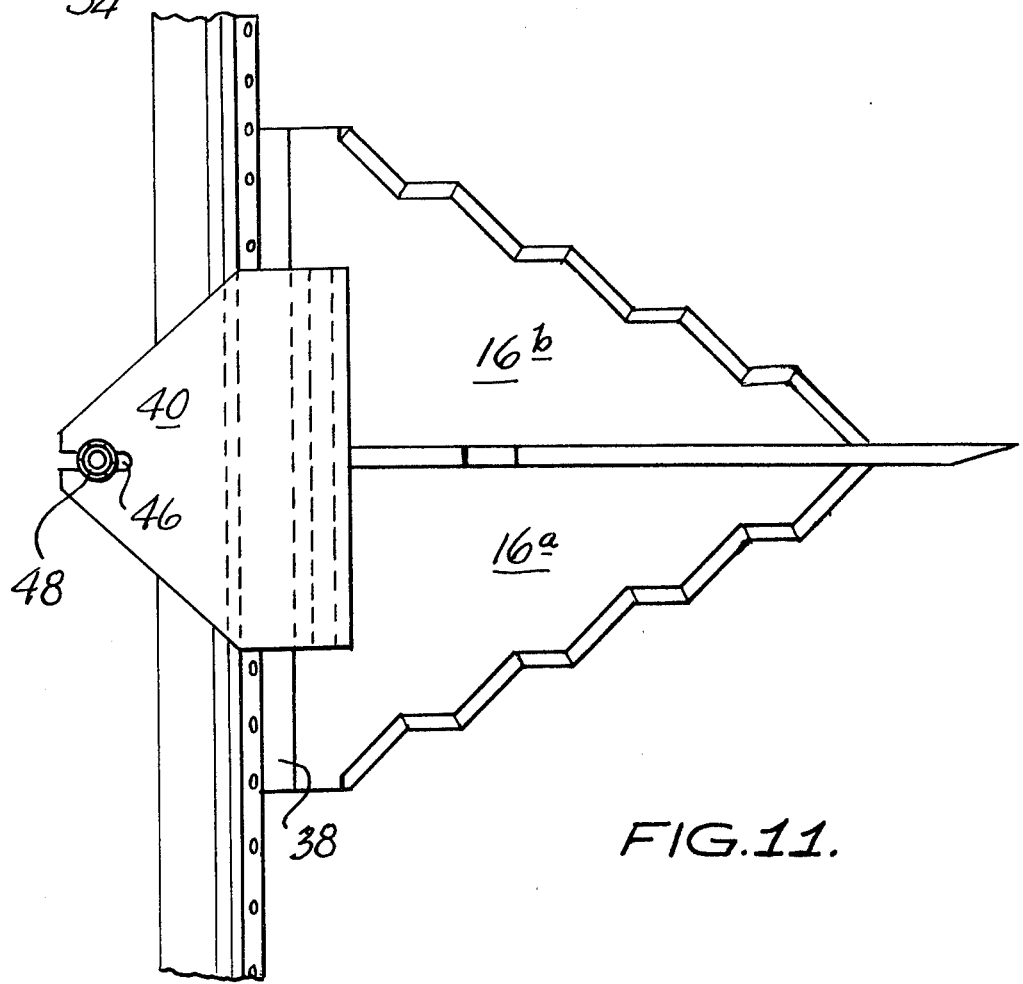

The means to secure the splitter of FIGS. 8 through 10 is shown most clearly in FIG. 10. This hitch is very simple. A generally vertical back plate 34 is provided that is secured, preferably by welding to the rear ends of cut off blades 16a and 16b and of splitter blade 10a and support plate 12a. Splitter blade 10a may be formed as blade 10 is to extend only a short distance from its cutting edge and supported by support plate 12a.

Back plate 34 is provided with a forwardly extending flange 36. Preferably a square bar 38 is secured across the width of blades 16a, and 16b at the juncture of blades 16a and 16b with back plate 34. The lower edge of bulldozer blade 14 is to rest on blades 16a and 16b immediately behind and pressed against bar 38.

A top plate 40 having a hook portion 42 to receive the forwardly extending flange 36 of back plate 34 is provided to extend rearwardly over the top edge of bulldozer blade 14. A stop 44 is fixed on the lower surface of top plate 40 to bear against the top edge of bulldozer blade 14.

An open slot 46 extends forwardly from the rear edge of top plate 40 to receive the nut 48 mounted on the upper end of turnbuckle 50. Nut 48 is provided with a squared portion that fits in slot 46 to prevent rotation of nut 48.

The lower end of turnbuckle 50 is secured by a bolt 52 to an upwardly extending tab 54 secured to the rear of blades 16a and 16b.

Mounting the stump splitter of this modification on a bulldozer blade is seen, therefore, to be very simple. It is only necessary to advance the bulldozer blade to bring its lower edge into position on the upper surface of cut off blades 16a and 16b and against bar 38. Hook portion 42 of top plate 40 is then engaged over flange 36 and moved rearwardly to bring stop 44 against the top edge of blade 14. Turnbuckle 50 is then swung up and nut 48 engaged in slot 46 of top plate 40. Turnbuckle 50 is then tightened and the stump splitter is mounted for use.

Having thus described the preferred embodiments of the invention it should be understood that numerous structural modifications and adaptations may be resorted to without departing from the spirit of the invention.

What is claimed is:

1. A stump splitter attachment for a bulldozer having a bulldozer blade, said attachment comprising a vertical sharp edged stump splitting blade extending forwardly of said attachment, at least one horizontally extending generally triangular cut off blade secured to said splitting blade from a position near the forward end of said splitting blade and having a rear edge lying in a plane normal to said splitting blade, and means to secure said attachment to the bulldozer blade in which said means to secure said attachment to the bulldozer blade consists of at least three ball means disposed in a triangular configuration secured to said attachment, socket means swingably mounted on said balls said socket means being provided with flanges including holes to receive bolts by which said socket means may be secured to the bulldozer blade.

2. The stump splitter attachment of claim 1 which two horizontally extending, generally triangular cut off blades are provided.

3. The stump splitter attachment of claim 2 in which said means to secure said attachment to the bulldozer blade includes back plate means extending in a plane normal to said splitting blade forwardly of the rear extremities of said cut off blades and generally normal to said cut off blades, said back plate being provided with a forwardly extending flange, a top plate formed with a hook portion to receive said forwardly extending flange, said top plate being provided with a stop means to engage the top edge of the bulldozer blade, a turnbuckle and means on the rear edges of said cut off blades and of said top plate to operatively engage the ends of said turnbuckle, whereby said attachment may be securely clamped to said bulldozer blade by operation of said turnbuckle.

4. The attachment of claim 1 in which said cut off blade extends upwardly and rearwardly from its vertical sharp edged portion, and finally forwardly to prevent material from being forced upwardly to pass over the top of the blade.

* * * * *